INVENTOR
ROBERT D. VEST

BY *James H. Ryan*

ATTORNEY

United States Patent Office 3,546,318
Patented Dec. 8, 1970

3,546,318
POLYSILICIC ACID/HYDROXYALKYL VINYL ETHER-POLYFLUOROOLEFIN COPOLYMER/ ALKALI METAL COMPOSITIONS CONTAINING CYCLIC POLYETHERS
Robert D. Vest, Wilmington, Del., assignor to E. I. du Pont de Nemours and Company, Wilmington, Del., a corporation of Delaware
Filed Feb. 9, 1967, Ser. No. 614,915
Int. Cl. C08g 47/10
U.S. Cl. 260—827    8 Claims

ABSTRACT OF THE DISCLOSURE

Coating compositions comprising polysilicic acid/hydroxyalkyl vinyl ether-polyfluoroolefin copolymer/alkali metal compositions having improved resistance to attack by water obtained by the addition thereto of the macrocyclic polyethers known as "crown" compounds.

FIELD OF THE INVENTION

This invention relates to, and has as its principal object provision of, improvements in coatings, particularly for plastics, to improve the adhesion and to increase the resistance of the same to attack by water and aqueous alkali.

PRIOR ART

In the Bechtold and Fawcett U.S. Pat. 3,429,845, there are disclosed improved coating materials particularly useful for glass substitutes such as plastics. The plastics themselves, e.g., poly(methyl methacrylate), have excellent resistance to shattering and are easily formed or fabricated and sealed to supports. They are, however, subject to surface scratchings since most of them are relatively soft. The Bechtold and Fawcett patent provides coating materials with superior surface hardness and adhesion by the use of solutions of polysilicic acid with polymers containing fluorine and primary alcoholic hydroxyl groups, but some of these coatings fail under certain conditions. Failure occurs particularly when the coating is contacted for extended periods of time with an aqueous alkaline material, e.g., a strong aqueous alkaline soap or a detergent solution containing ammonia or alkali. It has been shown in the Engelhardt U.S. Pat. 3,390,203 that when the composition contains 0.02 to 2%, based on weight of the polymeric ingredients, of dissolved sodium or potassium thiocyanate, carboxylates, or other salts which in the presence of a lower alkyl carboxylic acid give the corresponding alkali metal carboxylate, resistance to attack by aqueous alkali is considerably improved. Such improvement is needed since most cleaning solutions contain ammonia or an alkaline soap or detergent.

Although the addition of small amounts of sodium or potassium as selected salts provides a superior coated product, it has been found that coatings prepared from alakli metal salt-containing solutions have a tendency to lose their adhesion to the plastic substrate or show blisters or water spots after exposure to moisture. This effect is especially prevalent when the solution coating is dried at room temperature. The latter conditions are convenient for removing solvent with less fire hazard prior to high temperature curing. Unfortunately, the low-temperature drying of the preferred relatively thick coatings apparently causes salts (which are otherwise beneficial) to crystallize or separate out in some areas, which on exposure to water serve as loci for penetration and holding of water possibly by an osmolytic process.

It has now been found that the resistance of coatings of such type to aqueous conditions is improved by the addition of 0.01 to 5% (based on the weight of silica and the fluorine- and hydroxyl-containing copolymer) of the selected macrocyclic polyethers denoted as "crown" compounds described and claimed in the copending coassigned application of Pederson, Ser. No. 588,302 filed Oct. 21, 1966, now abandoned, and incorporated by reference. These polyethers, as hereinafter described, may act by complexing with salts present in the coating composition to keep them uniformly disseminated and compatible with the dried and cured coating.

DESCRIPTION OF THE DRAWING

Details of the invention will be understood from the remainder of the specification and from the drawings wherein the same numeral represents the same elements and in which.

DETAILS OF THE INVENTION

Figure 1:
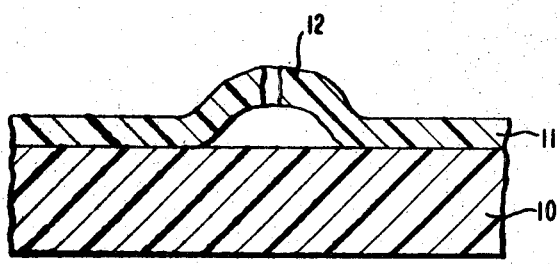
FIG. 1 shows a section of a preferred polymeric substrate 10 of the invention formed from poly(methyl methacrylate) and carrying a coating 11 of a material identical with that of the invention except that the "crown" compound is omitted therefrom and showing a bubble or blister 12 resulting from contact with hot water.
Figure 2:
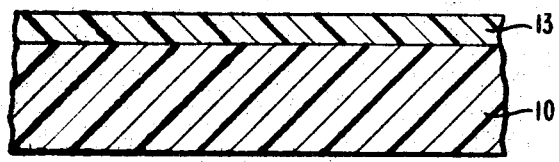
FIG. 2 shows a sectional view of an identical substrate 10 coated with a "crown" compound-containing coating 13.

The cyclic polyether compounds, the addition of which to known coating compostitions essentially comprises the present invention, include those composed of at least one and up to four vicinal arylenedioxy groups or derivatives thereof (especially the corresponding cycloalkylene vicinal dioxy having 6 carbon ring atoms), joined to form a macrocyclic polyether ring of at least 14 atoms (including at least 4 ring oxygens) by α,ω-diprimary alkylene groups or α,ω-diprimary alkylene ether groups, the oxygen atoms of the macrocyclic ring being separated by from 2 to 3 carbon atoms. Although compounds having 60 ring atoms have been prepared and are useful for the purpose of this invention, it is preferred that the ring have up to 30 atoms.

The term "arylene" is intended to include phenylene, naphthylene, anthrylene, phenanthrylene, and other polynuclear aromatic moieties; phenylene is preferred. The term "derivatives of an arylenedioxy group" means substitution derivatives of the aromatic nucleus including, but not limited to, halo, nitro, amino, azo, alkyl, aryl, aralkyl, alkoxy, cyano, hydroxy, carboxy, sulfo groups, and the like. Also included as "derivatives of an arylenedioxy group" are the saturated ring systems formed by the hydrogenation of the aromatic nuclei or their substitution products. The ring structure resulting from saturation of an "arylene" group by hydrogenation is called "cycloalkylene." Preferred compounds can be represented by the general formula

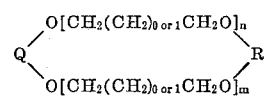

where Q is a divalent (vicinal) arylene group or derivative thereof including the corresponding cycloalkylene, R is Q or a 2–3 carbon alkylene group and n and m are integers of less than 10 and preferably together are no more than 8.

Illustrative representative compounds are the following which show the "crown" structure:

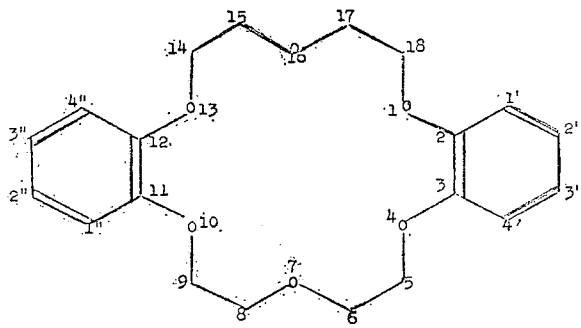

2,3,11,12 - dibenzo-1,4,7,10,13,16-hexocycloocadeca-2,11-diene and its reduced counterpart

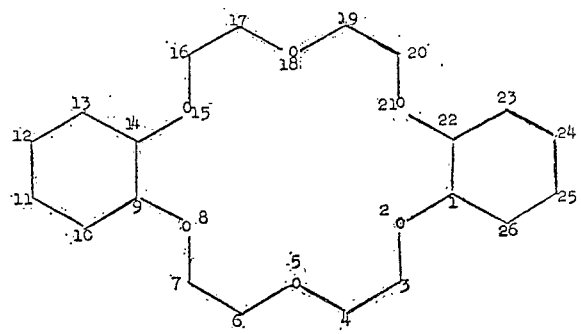

2,5,8,15,18,21-hexaoxatricyclo [20.4.0.0$^{9,14}$] hexacosane.

These compounds are generally prepared by reacting a vicinal dihydroxy aromatic compound such as catechol with an α,ω-alkylene diprimary dihadile (such as chloride) or ether in which the halogen and oxygen atoms are separated by chains of 2–3 carbon atoms in the presence of a strong base. Derivatives of the aromatic group employed are generally obtained by appropriate substitution or hydrogenation reactions on the macrocyclic ether containing the aromatic groups.

The coating compositions used for the preparation of improved coatings which have a high degree of resistance to moisture have from 10–90, preferably 20–45, parts of polysilicic acid (calculated as $SiO_2$) and an amount sufficient to make 100 parts by weight of an organic copolymer of a polyfluorinated polymerizable olefin with a monomer having primary alcoholic hydroxyl group, from 0.02–2% based on the weight of polymeric ingredients of potassium or sodium thiocyanates, or carboxylates, 0.01.5% of cyclic polyether together with solvents, and any desired optional ingredients to provide a coating solution.

The cyclic polyethers of the type defined above are outstanding in their advantageous effects upon the coatings. Other alkali metal chelating or complexing agents show improved adhesive and resistance to blistering in hot water; however, they are not nearly as effective as the macrocyclic polyethers for the present purpose. Examples of conventional chelating agents that have been employed to obtain some degree of improvement are 1,3-diketones such as acetyl acetone, β-keto esters such as ethyl acetoacetate, β-keto acid such as lactic acid, o-hydroxy aromatic acid such as salicyclic acid and o-amino aromatic acid such as anthranilic acid.

The polysilicic acid employed with the hydroxyl-bearing organic copolymers is readily available. For example, ethyl silicate (tetraethyl orthosilicate) is a commercial product. It is soluble in organic solvents and readily hydrolyzed by water to a useful soluble polysilicic acid. By use of varying amounts of water, the exact degree of hydrolysis can be varied. A compatible solvent system is a lower alcohol, particularly ethanol. A general formula for the preparation of the polysilicic acid solutions (15% $SiO_2$) is 100 parts by weight of ethyl silicate plus (92—X) parts of ethanol or similar diluent, X being the amount of water or, preferably, of 0.1 N hydrochloric acid employed. In general, X is preferably about 22.5 or greater. When X is 18 or less, the hydrolysis of ethyl silicate is insufficient to give a good polysilicic acid for use in this invention, unless further hydrolysis is brought about in the coating solution or process. Although more water can be used, i.e., X is up to 50 or more, such large amounts are generally not necessary and may affect adversely the compatibility with some of the organic polymers to be used. It is preferred that after hydrolysis the polysilicic acid solution is aged before use. At room temperature this aging requires only a few hours when X is 45 and somewhat longer when X is lower, e.g., when X is 22.5 the time may be 4–16 hours.

The synthetic hydroxyl-containing polymeric materials employed with the polysilicic acid are solid materials with an inherent viscosity of 0.1 or higher. Copolymers of the perhalogenated fluorine-containing monomers, such as, chlorotrifluoroethylene, hexafluoropropene, or tetrafluoroethylene with hydroxy-containing vinyl ethers are obtained by conventional polymerization techniques. These copolymers are generally about a 1:1 molar ratio of polyhalogenated olefin to vinyl ether. The vinyl ethers generally result from reaction of acetylene with polyhydric alcohols to provide as illustrative monomers the following: 2-hydroxyethyl vinyl ether, 4-hydroxybutyl vinyl ether, 3-hydroxypropyl vinyl ether, and 6-hydroxyhexyl vinyl ether. Preferably the vinyl ethers have the formula $CH_2=CHO(CH_2)_nOH$ where n is 2–8. A process for the preparation of such copolymers has been described in U.S. 3,159,610. As noted, the preparation of complexes of these copolymers with silica and the use of the complexes as coating materials is described in the above-mentioned Bechtold and Fawcett application.

Solvents useful for the preparation of coating compositions depend on the polymeric materials employed, on the substrate, and on other factors such as evaporation rate, etc. It is usually desired that the solvent have appreciable vapor pressure below 100° C. and preferably boil below about 100–125° C. The solvent system should be compatible with the ingredients in a wide range of proportions. Useful solvents include particularly lower alkanols (e.g., methanol, ethanol, propanols, butanols) and mixtures of alkanols with lower (1–3 carbon) alkanoic acids. Halogenated solvents, e.g., trichloroethylene, can be present. Adjuvants are optional and frequently anti-haze and leveling agents may be present.

The addition of small amounts (0.03–5%, based on weight of polysilicic acid/polymeric alcohol) of a block copolymer of mixed lower alkylene (2–4 carbon) oxides with dimethyl siloxane promotes even spreading and drying of the coating solution to form thick even coatings. Particularly preferred block copolymer adjuvants are those having units from both polyethylene oxide and polypropylene oxide and a dimethyl silane content of 20–25% as described in French Pat. 1,330,956 or U.S. 3,172,899. The use of the organosilicones in silica/polymeric alcohol coating solutions is described in copending application Ser. No. 464,184, filed June 15, 1965, now U.S. Pat. 3,476,827.

When the coating solution contains a lower alkanoic acid, any sodium or potassium added to the solution as a strongly basic compound or salt of a weak acid can be considered as present as the carboxylate. Thus, sodium or potassium borohydride, hydroxide, borate, and carbonate added to an acetic acid solution is present as an equivalent (on a molar basis) amount of sodium or potassium acetate. In the coating solution, the salt is in solution in ionic form, and it is the presence of small amounts of the sodium or potassium ion that increases resistance to attack of the cured coating by aqueous alkaline soap or detergent solutions containing ammonia or alkali such as present in cleaning materials. Sodium or potassium carboxylates such as benzoate, phthalate, or laurate can be used as the source of added sodium or potassium ion but preferably the carboxylate is of a lower (1–4 carbon) monocarboxylic acid, e.g., potassium formate, propionate or butyrate.

The coating solution, which usually has a viscosity of 10–300 cps., can generally be used in coating for several weeks after preparation, particularly if care has been taken to employ relatively pure ingredients and compatible solvents and additives. The solution can be applied to the surfaces to be protected (e.g., painted surfaces, glass, wood, metals, etc.) by known methods such as flowing, spraying, doctoring, gravure roll, dipping, etc. For spray applications or rapid withdrawal rates from baths, the viscosity is generally lower than for flowing or dipping using slow withdrawal rates. The solids content and viscosity are generally in direct proportion to the thickness desired in the final film. For example, with a solution of solids content of 10%, an initial thickness of solution layer should be about 75μ to give a final solvent-free coating of about 5μ. Solvents generally include both the lower alkanols and alkanoic acids such as 1–5 carbon alkanols and 1–3 carbon alkanoic acids. These are particularly preferred since they are compatible with the silicic acid which generally is in aqueous alcohol solution.

The solvent may be removed at room temperature or at elevated temperatures. If the coatings are allowed to air dry at room temperature, the moisture content of the air has a strong effect on the coating properties. For example, drying a typical 30 SiO₂/70 4-hydroxybutyl vinyl ether-tetrafluoroethylene copolymer coating in room air at above about 40% relative humidity prior to baking yields a hazy, soft coating instead of the desired hard, clear coating. It is preferable to dry panels in room temperature air which is at 0–35% R.H. Higher relative humidity conditions can be tolerated if the panels are placed in the oven with minimum contact with room temperature air. After removal of the solvent, the coating is either heated for some time (e.g., at 60° C. for 15 hours or at 170° C. for ¾ hour) or held for several days at room temperature to allow the coating to cure to the hard, abrasion-resistant layer desired. In general, the higher the silica content of the layer, the lower the temperature required for curing.

The polysilicic acid used in this invention is generally prepared by the hydrolysis of tetraethyl orthosilicate. Polysilicic acid, prepared in this manner, is a constantly changing material which can be represented (neglecting end groups) by a structure.

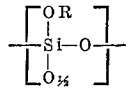

where R is C₂H₅ or H depending on the amount of water present during the hydrolysis and the age of the hydrolysate. In freshly hydrolyzed X=22.5 silicic acid the ratio of ethoxy to silanol groups may be as high as 5:1; however, on aging the silicic acid 24 hours this ratio drops to about 0.5:1. With increasing water content in the hydrolysate, for example in aged X=45, this ratio drops to zero. The "O₁/₂" represents a shared oxygen between silicons and may represent an interchain bond or a cyclic unit. Polysilicic acid as utilized in these formulations contains approximately one hydroxyl (or alkoxy) group per silicon. General changes in the structure of polysilicic acid may or may not occur when the polysilicic acid is mixed with the organic polymer, or during the curing cycle which followed. The units of polysilicic acid having R–H may interact with organic hydroxyl-containing polymers by condensation (elimination of water) or by hydrogen bonding.

The ultimate hard structure is thus thought to consist of two coextensive compatible transparent structures, one of a tough linear polymer chemically bonded, hydrogen bonded and/or mechanically entwined with a hard, three-dimensional

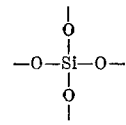

network on which there remain some silanol groups. In other words, the structure can be pictured as a macromolecular (nonparticulate) reinforcement of the essentially linear organic polymer or as a plasticization of a hard polyfunctional condensation polymer (polysilicic acid) with a tough linear organic polymer. It may thus be regarded as an interlocking copolymer or complex of silica and the preformed copolymer containing entrapped (or replacement) sodium and/or potassium.

Regardless of the theoretical structure of the ultimate hard coating complex of this invention, it provides insoluble, inert, abrasion-resistant finishes that are also resistant to aqueous alkaline conditions. Polymeric materials coated with the new composition are useful in the fabrication of flat or curved plastic enclosures, such as windows, windshields, lenses, etc.

The following nonlimiting examples illustrate specific embodiments of this invention. In these examples, parts, percentages, and ratios are by weight and temperatures and pressures are ambient unless otherwise specified.

Example 1

(A) (1) A coating solution was prepared containing the following:

37.4 g. of hydrolyzed ethyl silicate (15% SiO₂; X=45) in ethanol 14.4 g. of n-butyl alcohol 109.0 g. of 12.1% of 4-hydroxybutyl vinyl ether/tetrafluoroethylene copolymer (mol ratio of 1/1) in n-butyl alcohol 39.0 g. of acetic acid 0.3 g. of alkylene oxide/methyl siloxane copolymer (Union Carbide Corp. L–520)

0.092 g. of potassium thiocyanate 0.5 g. of the reduced reaction product of catechol with β,β′-dichloroethyl ether, i.e., 2,5,8,15,18,21-hexaoxatricyclo[20.4.0.0⁹,¹⁴]-hexacosane having the structure

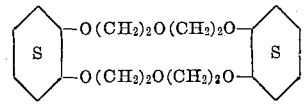

Panels of clear poly(methyl methacrylate) sheeting were immersed in the above solution for about two minutes, followed by vertical withdrawal at a rate of about 8–10 in./min. The coated panels were air dried for about 15 minutes and placed in an air circulating oven for ½ hour at 170° C. to give optically clear coatings of about 3–6μ thickness.

Portions of the coating were rubbed with a bar of an alkaline soap and placed in an atmosphere having 100% humidity for 16 hours. No surface damage due to the alkaline soap was seen.

The panels were immersed in water at 60° C. for 2 hours, removed and dried. Sections of the coating were scratched into small squares by scoring (crosshatch). Adhesion was determined by applying an adhesive tape over the crosshatch pattern followed by rapidly removing the tape. No failure of the coating due to sticking to the adhesive was noted. No blister damage due to exposure to water was observed.

In 1000 hours' exposure in a Weather-O-Meter, the coating retained good optical characteristics.

(2) When a control panel was tested similarly to the preceding except that no cyclic ether was present in the

7 coating composition used, the coating did not adhere to the polymer substrate after exposure to water and large blisters or water spots were noted.

(B) 2,5,8,15,18,21 - hexaoxatricyclo[20.4.0.0$^{9,14}$]-hexacosane may be prepared as follows:

(1) A 500-ml. round-bottom flasp equipped with a thermometer, a reflux condensor and an agitator, was charged with 5.02 grams (0.0173 gram-mole) of bis[2-(o-hydroxyphenoxy)ethyl]ether, 50 ml. of water, 50 ml. of n-butanol, 1.384 grams (0.0346 gram-mole) of sodium hydroxide and 2.68 grams (0.0187 gram-mole) of bis-(β-chloroethyl)ether. The charge was refluxed under nitrogen, while vigorously agitated, for 23 hours and 37 minutes; during this time the pot temperature rose from 94° C. to 95° C.

On cooling to room temperature, the charge separated into two layers. The white hair-like crystals filling the upper layer were filtered, washed with methanol and dried. The recovered crystals weighed 2.3 grams and were 91% pure. The rest of the charge contained 2.95 grams of product, or a total of 5.05 grams. The pure product, 2,3,11,12 - dibenzo - 1,4,7,10,13,16-hexaoxacyclooctadeca-2,11-diene, was obtained by distillation at 0.4 mm. (while heated).

Calculated for $C_{20}H_{24}O_6$ (percent): C, 66.6; H, 6.7; M.W. 360. Found for product (percent): C, 66.2, 66.3; H, 6.6, 6.9; M.W. 371.

Melting point: 163.5° C. (aluminum block)

INFRARED SPECTRUM

Cyclohexane, mμ:
   274.5 _____ ε=4,400
   278.5 _____ ε=4,700
   283.5 _____ ε=3,600
Methanol: 277 _____ ε=5,300

NMR spectrum: consistent with proposed structure (2) A 1-liter stainless steel shaker bomb was charged at 25° C. with 650 ml. of p-dioxane, 60 g. of 2,3,11,12-dibenzo-1,4,7,10,13,16 - hexaoxacyclooctadeca-2,11-diene prepared as above, and 5 g. of ruthenium dioxide catalyst. After the bomb had been closed and readied for hydrogenation, the internal temperature was raised to 100° C., and the charge was hydrogenated while shaken at 1550 lbs./sq. in. (gauge) for 5 hours. The bomb was then cooled and discharged.

The catalyst was removed by filtration. To keep it from heating up while air was being drawn through it, the catalyst was kept wet with water. Concentration of the filtrate in a rotary evaporator (0.5 mm. of Hg at 60° C.) gave 59 grams of colorless, viscous residue. This material was passed through a 4.8 x 25 cm. column of acid-washed alumina that had been prepared with petroleum either (boiling point 60° C./760 mm. of Hg), and eluted with 860 ml. of n-heptane. When concentrated by evaporation, the eluate yielded 41.3 g. of 2,5,8,15,18,21-hexaozatricyclo [20.4.0.0$^{9,14}$] hexacosane as a colorless, very viscous oil. Yield: 66.7%. This oil can be made to solidify overnight at room temperature if a trace of the crystalline material itself is added.

Analytically pure compound was obtained by dissolving 6.2 g. in 25 ml. of methanol, adding 75 ml. of water at 25° C., and keeping the mixture cool in an ice-bath. The crystals that separated were filtered, washed with water, and dried in a vacuum oven at 40° C. Soft white crystals, weighing 2.3 g., were recovered.

Calculated for $C_{20}H_{36}O_6$ (percent): C, 64.5; H, 9.7. Found for product (percent): C, 64.4, 64.5; H, 9.6, 9.7.

Molecular weight: 378
Melting point: 68.5–69.5° C. (aluminum block)
Infrared Spectrum: No OH band.
Ultraviolet Spectrum: No absorption above 220 mμ.
NMR: Consistent with proposed structure.

8

Example 2

(A) A coating solution was formulated as in Example 1 except that no complexing agent was added. Panels of poly(methyl methacryate) were dipped, air dried, and cured as described for Example 1.

To 100-gram portions of this coating solution was added 0.50 g. of complexing agents B and C and panels prepared as before. Selected properties are shown below.

| Additive | Scratch resistance | Adhesion,[1] percent | Water spots |
|---|---|---|---|
| None | Excellent | 0 | Yes. |
| B | do | 100 | None. |
| C | do | 100 | Do. |

[1] After 60° C. water.

Additive B has the formula

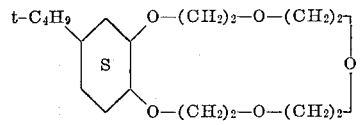

and can be named as 17-t-butyl-2,5,8,11,14-pentaoxabicyclo[13.4.0]nonadecane.

Additive C has the formula

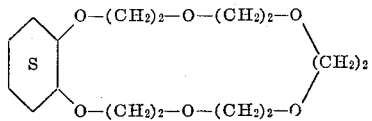

and can be named 2,5,8,11,14,17-hexaoxabicyclo[16.4.0]docosane.

(B) Additive B, 17-t-butyl-2,5,8,11,14-pentaoxabicyclo-[13.4.0]nonadecane, can be prepared as follows:

(1) A 2-liter round-bottom flask equipped with a thermometer, a reflux condenser, and an agitator, was charged with 33.2 g. (0.2 gram-mole) of 4-t-butylcatechol, 700 ml. of n-butanol, 17 g. (0.425 gram-mole) of sodium hydroxide in 40 ml. of water, and 46.2 g. (0.2 gram-mole) of 1,11-dichloro-3,6,9-trioxaundecane. The charge was refluxed under nitrogen, while vigorously agitated, for 17 hours during which time the pot temperature dropped from 103.5 to 100° C.

The product, 2,3-(4'-t-butylbenzo)-1,4,7,100,13-pentaoxacyclopentadeca-2-ene, was obtained by formation of a complex with potassium thiocyanate in methanol, decomposed with water, extracted with chloroform and distilled from a rotary evaporator at 0.45 mm.

Calculated for $C_{18}H_{28}O_5$ (percent): C, 66.7; H, 8.6; M.W. 324. Found for product (percent): C, 66.8, 67.0; H, 8.5, 8.6; M.W. 328.

Infrared spectrum: no OH band
Ultraviolet spectrum: Methanol: 278 mμ—ε 2,700

(2) A 1-liter stainless steel shaker bomb was charged with 450 ml. of p-dioxane, 53 g. (0.164 gram-mole) of 2,3-(4'-t-butylbenzo) - 1,4,7,10,13 - pentaoxacyclopentadeca-2-ene prepared as above and 20 g. of 5% ruthenium on carbon. Hydrogenation was subsequently carried out for 19 hours while the bomb was shaken at 100° C. under a pressure of 1600 p.s.i.g.

After the contents of the bomb had been cooled to 25° C., they were removed and filtered. The catalyst-free filtrate was then concentrated in a rotary evaporator at 60° C. and 0.5 mm. of Hg. The vicous residue obtained, weighing 48.1 g., was twice chromatographed on acid-washed alumina using n-heptane. The eluate, 11.7 g. of oil, was still contaminated with compounds containing a hydroxyl group. Eleven grams of this product were treated at 80° C. with 1 ml. of 2,4-toluene diisocyanate and 3 drops of triethylamine, warmed on a steambath, and then allowed to stand at 25° C. overnight. Five milliliters of water were added and the mixture stored for two days at 25° C. The resulting mixture was then dried in a rotary evaporator, taken up with 200 ml. of n-heptane, filtered to remove insoluble matter and the filtrate was concentrated in a rotary evaporator at 60° C. and 0.5 mm. of Hg. The residue, 9.3 g. of nearly colorless oil, was the desired product 17-t-butyl-2,5,8,11,14-pentaoxabicyclo[13.4.0]nonadecane. Yield: 17%. A portion was distilled at 0.8 mm. of Hg and ca. 200° C. to obtain an analytical sample.

Calculated for $C_{18}H_{34}O_5$ (percent): C, 65.5; H, 10.3; M.W. 330. Found for product (percent): C, 64.9, 65.0; H, 10.3, 10.4; M.W. 320.

Infrared spectrum: No OH band.
Ultraviolet spectrum: No absorption above 220 m$\mu$.

(C) Additive C, 2,5,8,11,14,17-hexaoxabicyclo[16.4.0]docosane, can be prepared as follows:

(1) A 500-ml. round-bottom flask equipped with a thermometer, a reflux condenser, and an agitator, was charged with 6 g. (0.0546 gram-mole) of catechol, 200 ml. of n-butanol, 4.4 g. (0.11 gram-mole) of sodium hydroxide in 10 ml. of water, and 15 g. (0.0546 gram-mole) of 1,4-dichloro - 3,6,9,12 - tetraoxatetradecane. The charge was refluxed under nitrogen, while vigorously agitated, for 6.25 hours during which time the pot temperature dropped from 104.5 to 102.5° C.

The charge was filtered hot and evaporated to dryness in a rotary vacuum evaporator at 60° C. The viscous, oily residue (18.5 g.) was extracted with 100 ml. of chloroform, and the resultant extract was washed twice with 50 ml. of 5% aqueous sodium hydroxide, dried with anhydrous sodium sulfate, and evaporated to dryness. The viscous, oily residue (12.5 g.) was distilled from a rotary evaporator at 0.45 mm. The nearly colorless, viscous distillate (9.9 g.) contained 58% by weight of the desired product. The pure 2,3-benzo-1,4,7,10,13,16-hexaoxacyclooctadeca-2-ene was obtained through the potassium thiocyanate complex formed in methanol, decomposed with hot water, extracted with hot benzene and evaporated to dryness in a rotary evaporator at 0.45 mm. of Hg and 60° C.

Calculated for $C_{16}H_{24}O_6$ (percent): C, 61.5; H, 7.7; M.W. 312. Found for product (percent): C, 61.2, 61.3; H, 7.5, 7.6; M.W. 319.

Melting point: 43–44° C.
Infrared spectrum: no OH band
Ultraviolet spectrum: Methanol: 275 m$\mu$—$\epsilon$=2,100

(2) A 500-ml. stainless steel shaker bomb was charged at 25° C. with 250 ml. of p-dioxane, 50.3 g. (0.161 gram-mole) of 2,3 - benzo - 1,4,7,10,13,16 - hexaoxacyclooctadeca-2-ene and 3 g. of ruthenium dioxide catalyst. The bomb was sealed and the charge therein was subsequently hydrogenated at 100° C. and 1600 p.s.i.g. for 13 hours while shaken. After being cooled to 25° C., the bomb was discharged and the catalyst filtered off.

The catalyst-free filtrate was concentrated in a rotary vacuum evaporator at 60° C. and 0.5 mm. of Hg. The viscous residue weighing 44 g. was put on a 4.8 x 25 cm. column of acid-washed alumina and eluted with 500 ml. of n-hexane at 25° C. Evaporation of the eluate gave 24.5 g. of 2,5,8,11,14,17-hexaoxabicyclo[16.4.0]-docosane as a colorless, viscous oil. Yield: 48.3%.

Calculated for $C_{16}H_{30}O_6$ (percent): C, 60.4; H, 9.4; M.W. 318. Found for product (percent): C, 60.3, 60.5; H, 9.4, 9.5; M.W. 314.

Infrared spectrum: No OH band.
Ultraviolet spectrum: No absorption above 220 m$\mu$.

Example 3

A coating solution was prepared containing the following:

56.1 g. of hydrolyzed ethyl silicate (15% $SiO_2$; X=45) in ethanol
21.6 g. of n-butyl alcohol
163 g. of 12.1% of 4-hydroxybutyl vinyl ether/tetrafluoroethylene copolymer in n-butyl alcohol (mol ratio of 1/1)
55.5 g. of acetic acid
4 drops of alkylene oxide/methyl siloxane copolymer (Union Carbide Corp. "L–520")
0.75 g. of the reduced reaction product of catechol with $\beta,\beta'$-dichloroethyl ether (see Example 1), i.e., 2,5,8,15,18,21-hexaoxatricyclo-[20.4.0.0$^{9,14}$]hexacosane Thirty-gram portions of the coating solution were modified by adding 0.02 g. each of sodium benzoate and sodium formate.

Panels of polymer sheeting were coated and tested as described in Example 1. Aqueous alkaline soap caused no damage to the coated panels and improved adhesion and resistance to blistering in hot water was noted as compared to control panels.

Example 4

A coating solution was prepared containing the following:

28.0 g. of hydrolyzed ethyl silicate (15% $SiO_2$; X=22.5)
15.0 g. of acetic acid
67.0 g. of 14.7% 4-hydroxybutyl vinyl ether/hexafluoropropene copolymer in ethanol/n-butyl alcohol (4.96/1)
0.056 g. of alkylene oxide/methyl siloxane (see Example 1)
0.035 g. of potassium thiocyanate
0.14 g. of the reduced reaction product of $\beta,\beta'$-dichloroethyl ether with catechol (see Example 1), i.e., 2,5,8,15,18,21-hexaoxatricyclo-[20.4.0.0$^{9,14}$]hexacosane.

Following the general procedure of Example 1 coatings of about 5.43$\mu$ on poly(methyl methacrylate) were obtained on curing for 45 minutes at 170° C. The scratch-resistant coatings had superior adhesion and resistance to hot water as compared to coatings having no complexing agents.

Example 5

A coating bath containing the following was prepared:

7,056 g. of hydrolyzed tetraethyl silicate obtained from a solution originally made from 4,250 g. of tetraethyl silicate, 1,997.5 g. of ethanol and 1,912.5 g. of 0.1 N hydrochloric acid
8,400 g. of acetic acid
9.8 g. of potassium thiocyanate
23,440 g. of 11.3% 4-hydroxybutyl vinyl ether/tetrafluoroethylene copolymer in t-butyl alcohol/n-butyl alcohol (90/10)
15.7 g. of an organo-silicone block copolymer of ethylene oxide and propylene oxide with dimethyl siloxane (Union Carbide "L–520")
784 g. of 15% hexamethoxymethylmelamine in n-butyl alcohol 47.6 g. of 2,5,8,15,18,21 - hexaoxatricyclo-[20.4.0.0$^{9,14}$]hexacosane (Example 1)

Panels of 4' x 4' of poly(methyl methacrylate) were dipped into a tank containing the above solution, allowed to remain for 2 min. and withdrawn vertically at a rate of about 12 inches per minute, and then heated in an oven for one hour at 170° C. The coated panel had an excellent appearance and underwent substantially no change on rubbing with a foaming cleanser. The coating was about 5–6.6$\mu$ in thickness on each side. The coating had excellent resistance to alkaline soap and ammoniacal cleaning solutions, saturated salt solution at 60° C., acetone, and 40% sulfuric acid. Water at 60° C. for 2 hours was substantially without effect. Similarly, rubbing soap on the coating followed by exposure to moisture for 16 hours showed substantially no change in the surface or its adhesion.

In addition to the macrocyclic polyether compounds specifically described in the preceding, many others of this general type are also useful. These include the following:

(A) 2,3,14,15 - dibenzo - 1,3,7,10,13,16,19,22-octaoxacyclotetracosa-2,14-diene [from sodium hydroxide, catechol, and 1,2-bis(β-chloroethoxy)ethane along with inert 2,3-benzo-1,4,7,10-tetraoxacyclododeca-2-ene];

(B) 2,3,17,18 - dibenzo - 1,4,7,10,13,16,19,22,25,28 - decaoxacyclotriaconta - 2,17 - diene [from sodium hydroxide, catechol and 1,11-dichloro-3,6,9-trioxaundecane]. Reduction of this product gives (C) 2,5,8,11,14,21,24,27,30,33-decaoxatricyclo [32.4.0.0$^{15,20}$] octatriacontane;

(D) 2,3,9,10-dibenzo - 1,4,8,11 - tetraoxacyclotetradeca-2,9-diene [from 1,3-bis(o-hydroxyphenoxy)propane as its sodium salt and 1,3-dibromopropane]. Hydrogenation of this product gives (E) 2,6,13,17-tetraoxatricyclo [16.4.0.0$^{7,12}$] docosane;

(F) 2,3,8,9,14,15,20,21 - tetrabenzo - 1,4,7,10,13,16,19,22-octaoxacyclotetracosa-2,8,14,20-tetraene [obtained as residue from high vacuum distillation of the reaction product of the sodium salt of catechol and o-bis(β-chloroethoxy)benzene];

(G) 2,3,8,9,14,15 - tribenzo - 1,4,7,10,13,16,19,22-octaoxacyclotetracosa-2,8,14-triene [obtained from sodium hydroxide, 1,2-bis/β-(o-hydroxyphenoxy)] ethane and 1,2-bis[β-(chloroethoxy)benzene];

(H) 2,3,9,10-bis(t-butylbenzo - 1,4,8,11 - tetraoxacyclotetradeca-2,9-diene [from the sodium salt of 1,3-bis(o-hydroxy-p-t-butylphenoxy)propane and 1,3-dibromopropane]. Hydrogenation of the product with ruthenium dioxide gives (I) 9,20(or 21)-di(t-butyl) - 2,6,13,17 - tetraoxatricyclo [16.4.0.0$^{7,12}$]docosane;

(J) 2,3,8,9-dibenzo - 1,4,7,10,13 - pentaoxacyclopentadeca-2,8-diene [from the sodium salt of 1,2-bis(o-hydroxyphenoxy)-ethane and bis(β-chloroethyl)ether];

(K) 2,3,9,10-dibenzo - 1,4,8,11,14 - pentaoxacyclohexadeca-2,9-diene [from the sodium salt of 1,3-bis(o-hydroxyphenoxy)-propane and bis(β-chloroethyl)ether]; and (L) 2,3,11,12-bis(2',3'-naphtho) - 1,4,7,10,13,16 - hexaoxacyclooctadeca-2,11-diene [from sodium hydroxide, 2,3-dihydroxynaphthalene and bis(β - chloroethyl) ether].

In addition, nuclear substituents can be present; for example, the sulfo, nitro and halo products are useful. When 2,3,11,12-dibenzo - 1,4,7,10,13,16 - hexaoxacyclooctadeca-2,11-diene is reacted with concentrated sulfuric or nitric acid, the corresponding disulfo or dinitro derivatives are obtained, the latter being reducible. Chlorination gives corresponding chloro compounds.

Preferred for the purposes of this invention are oxahydrocarbyl macrocycles (i.e., have only hydrogen, carbon and ether oxygen) in which one to four (generally up to two) 6-membered hydrocarbyl rings (benzenoid or cyclohexyl) are present as part of the macrocycle and joined to the latter ring through vicinal dioxy groups.

Since obvious modifications and equivalents in the invention will be evident to those skilled in the chemical arts, I propose to be bound solely by the appended claims.

The embodiments of the invention in which an exclusive property or privilege is claimed are defined as follows:

1. In a coating composition formed from polysilicic acid and a copolymer of chlorotrifluoroethylene or tetrafluoroethylene and an ω-hydroxyalkyl vinyl ether and containing a small amount of at least one member of the group consisting of sodium and potassium thiocyanate, carboxylates and salts which give carboxylate in the presence of a lower alkyl carboxylic acid, the improvement comprising the incorporation within said composition of
about 0.01–5% by weight, based on the combined weight of the polysilicic acid, calculated as $SiO_2$, and fluorine- and hydroxy-containing copolymer, of a macrocyclic polyether having the formula

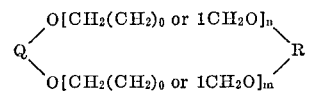

wherein Q is a divalent vicinal arylene group or derivative thereof selected from
  (a) phenylene, t-butyl phenylene, naphthylene, anthrylene, and phenanthrylene;
  (b) halo, nitro, amino, azo, cyano, hydroxy, carboxy, and sulfo derivatives of the arylene groups enumerated in (a);
  (c) a saturated ring system formed by the hydrogenation of one of the arylene nuclei enumerated in (a) above;
  (d) a saturated ring system as defined in (c) above substituted by halo, nitro, amino, azo, cyano, hydroxy, carboxy, or sulfur groups; R is Q or a 2–3 carbon alkylene group; and $n$ and $m$ are integers of less than 10.

2. The coating composition of claim 1 in liquid solution.

3. The coating composition of claim 1 in solid form laid down upon a plastic substrate.

4. The coating composition of claim 1 wherein the copolymer is a copolymer of tetrafluoroethylene and 4-hydroxybutyl vinyl ether.

5. The coating composition of claim 1 wherein the copolymer is a copolymer of hexafluoropropene and 4-hydroxybutyl vinyl ether.

6. The coating composition of claim 1 wherein the macrocyclic polyether is 2,5,8,15,18,21-hexaoxatricyclo-[20.4.0.0$^{9,14}$]hexacosane.

7. The coating composition of claim 1 wherein the macrocyclic polyether is 17-t-butyl-2,5,8,11,14-pentaoxabicyclo[13.4.0]nonadecane.

8. The coating composition of claim 1 wherein the macrocyclic polyether is 2,5,8,11,14,17-hexaoxabicyclo[16.4.0]docosane.

References Cited
UNITED STATES PATENTS

| | | | |
|---|---|---|---|
| 3,390,203 | 6/1968 | Engelhardt | 260—827 |
| 3,429,845 | 2/1969 | Bechtold et al. | 260—827 |

ALLAN LIEBERMAN, Primary Examiner

J. H. DERRINGTON, Assistant Examiner

U.S. Cl. X.R.

117—138.8, 161; 260—41, 340.3.